Figure 1:
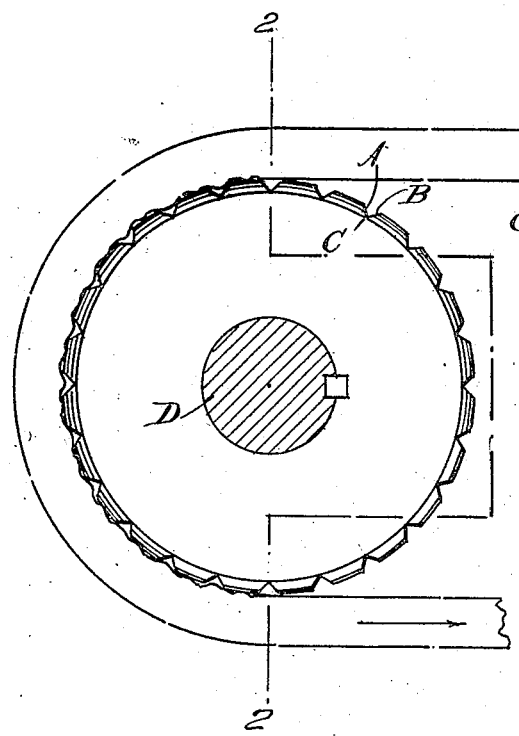

Jan. 30, 1923.

M. F. WILLIAMS.
CROSS GROOVED PULLEY.
FILED MAR. 21, 1921.

1,443,514

Inventor
Milton F. Williams,
By H. M. Plaisted.
Attorney

Patented Jan. 30, 1923.

1,443,514

UNITED STATES PATENT OFFICE.

MILTON F. WILLIAMS, OF ST. LOUIS, MISSOURI, ASSIGNOR OF FORTY-NINE ONE-HUNDREDTHS TO HAROLD M. PLAISTED, OF ST. LOUIS, MISSOURI.

CROSS-GROOVED PULLEY.

Application filed March 21, 1921. Serial No. 454,157.

*To all whom it may concern:*

Be it known that I, MILTON F. WILLIAMS, a citizen of the United States, residing at St. Louis, State of Missouri, have invented certain new and useful Improvements in Cross-Grooved Pulleys, of which the following is a specification.

This invention relates to certain new and useful improvements in pulleys, the peculiarities of which will be fully described and claimed.

The main object of my invention is to provide a pulley, the normal face of which is provided with cross grooves of such shape as to improve, when rotating, the belt contact between a belt and pulley face, whereby more power is transmitted from belt to pulley, or vice versa; secondly, to reduce the whistling or humming sound of a grooved face pulley; and thirdly, to increase the tendency of the belt to hug the grooved face of a pulley.

In my prior application on pulleys Patent No. 1,423,476 dated July 18, 1922, I have shown and described a pulley face having cross grooves,—each groove being formed by a radial face, and an opposing face slanting backward with regard to the direction of rotation, and applied to the normal face of a crown face pulley and a straight face pulley.

That form of pulley tested out a greater efficiency than a plain face pulley, but when its direction of rotation was reversed so that the slant side inclined forward in regard to the direction of rotation, the efficiency obtained was even greater.

It was due to this discovery and after careful tests had been made to substantiate the same, that a pulley having a face grooved in accordance with the present application was designed and tested out, and will now be described.

Figure 2:
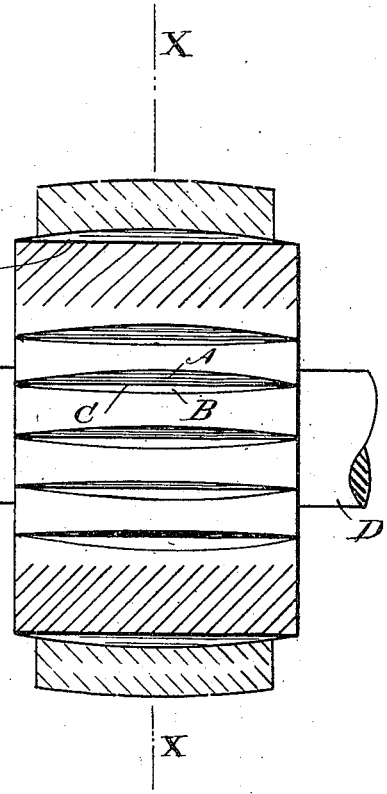

In the accompanying drawing on which like reference letters indicate corresponding parts, Fig. 1 represents a side elevation of a crown face pulley exemplifying my invention and mounted on a shaft shown in section, and having a belt indicated in broken lines as driving said pulley; Fig. 2 a partial face view of said pulley and partial section on the line 2—2 of Fig. 1; and Fig. 3 an enlarged detail view across the shaft in section of a portion of such a pulley face.

Figure 3:
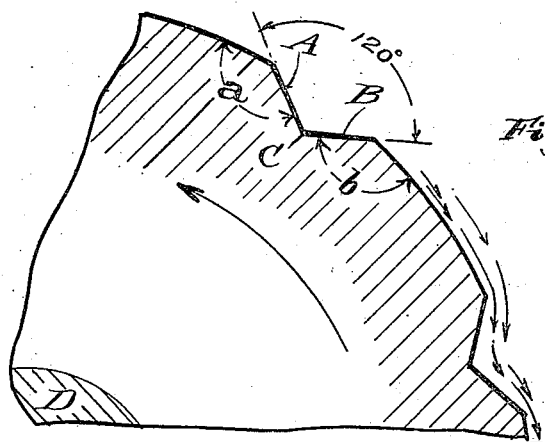

In carrying out the improved design suggested by the tests above mentioned, a plain faced crown pulley was transversely grooved with grooves having opposing faces A and B (Fig. 1) that are inclined toward each other, and make an obtuse angle with the portion of the normal face respectively adjacent as more plainly shown in the enlarged view, Fig. 3. These faces A and B meet in an intersecting line or surface C that is practically parallel with the shaft D on which the pulley is mounted, so that when a crown face pulley is provided with grooves having faces A and B inclined as shown and described, the grooves formed in the normal face are substantially as shown in the face view Fig. 2 herein. That is to say, the width of each groove circumferentially, decreases from the central plane X (Fig. 2) toward each end of the pulley. The slanting faces A and B likewise decrease from the said central plane X towards the ends of the pulley; and the radial depth of the groove similarly decreases from the central plane to the ends of the pulley. It is preferred that the inclination of the faces A and B toward one another, (whether intersecting at a line C as described or otherwise,) should present an angle of 90 degrees or more,—that is, an obtuse angle,—for reasons that will appear hereafter.

Whatever the inclination toward each other of opposing faces of the same groove may be, the angle $a$ and $b$ (Fig. 3) made by the respective faces A and B with the adjacent normal face of the pulley, should be an obtuse angle. Thus in Fig. 3 this angle between the opposing faces A and B in a groove is practically 120 degrees; and the angles of said faces with the respective normal face—indicated by $a$ and $b$—are substantially 120 degrees as shown.

It has been found by careful tests under similar circumstances to the tests made upon a plain crown face pulley and a pulley grooved according to that described in said prior application, that the power transmitted by the belt to a pulley having grooves as in the present application and of similar diameter, (that is, 8″,) was 294#. This is 147# greater or 100% greater than the plain face pulley. Again, this is 49# greater or 20% greater than the pull exerted by said belt against the radial face of a groove. Furthermore and finally, this is 24# greater or 9% greater than the pull exerted by a belt upon the slant face of a radial and slant faced groove, as above stated.

Thus I have discovered that a pulley face having grooves the opposing faces of which are substantially as shown in the drawing herewith, is capable of much greater efficiency, namely 100%,—than a plain face pulley; secondly, that it is 20% greater efficiency when compared with a radial face groove; and thirdly, that it is 9% greater when compared with a groove only one of which faces is slanting, and that forward in the direction of rotation. It is believed that the greater efficiency thus obtained by grooves as in the present application, is due to the following reasons:

Referring to Fig. 3,—when a pulley is rotating in the direction of the arrow there shown, the surface of the pulley not covered by the belt (that is, between the advancing and receding portions of the belt,) drag along with the face of the pulley a certain amount of adjacent air by frictional action thereon. As is well known in the science pertaining thereto, the friction of the air upon an adjacent surface relatively stationary, retards the flow of air currents at such surface so that the effective area (such as that of an air tube transmitting air currents,) is reduced in certain definite amounts. In a similar way with the air currents from the approaching belt driven against the revolving pulley the friction of the air upon the surface of a pulley as shown, causes air currents that are slower and relatively backward adjacent to the pulley face, and causes such air currents to be deflected into the grooves in the normal face. When such grooves are as shown in this application, the flow of air into and out of said grooves will be facilitated by the slanting sides A and B; under high speed, this travel of the air into and out of the grooves will tend to form a rarefication in said grooves. When the belt therefore covers such grooves as in Fig. 1, the rarefication thus produced will vary atmospheric pressure and tend to press the belt with greater effect upon the normal face of the pulley between the grooves, and likewise into the grooves themselves, when they are formed as shown in this application. Thus not only will the cushioned air brought in by the approaching portion of the belt be deflected laterally by said grooves in the pulley face, but the readiness of discharge of the air from grooves herein shown and described, produces an added atmospheric pressure due to the partial vacuum obtained by the flow of air currents into and out of said grooves in a readier manner and with greater effect than when the grooves are formed according to the prior application first above mentioned. Thus in said prior application, the half filled grooves formed by the radial face of a pulley rotating as shown in Fig. 1 of that patent, would tend to support or bridge over the air currents endeavoring to enter said V groove; and when such a pulley is rotated in the opposite direction (that is, with the slant face forward,) the radial face mentioned will obstruct the ready discharge of the air entering said grooves. In my present application this bridging over of the air currents, and obstruction to discharge of said currents from the grooves, is avoided by the advance or forward inclined face A and rearward inclined face B making the respective angles $a$ and $b$ with the adjacent normal face—which angles are substantially identical. It is on account of this discovery of the improved efficiency of a groove having both sides or opposing faces formed as herein described, that I claim such a groove face broadly, and do not confine myself to any particular obtuse angle between said faces and the normal face of the pulley. In the tests above described, an 8" crown face pulley was provided with 22 grooves in its circumference, and each groove was substantially a quarter of an inch in circumferential width at the central plane X of said face, and diminishing in width towards the ends according to the crown of the pulley, substantially as shown. I do not limit myself to the exact spacement or center to center distance of the said grooves, but state that the grooves in the pulley as tested above where substantially $1\frac{1}{16}$ inches center to center.

I claim:

1. A high speed circular pulley provided with transverse grooves,—one of the opposing faces of each groove making an obtuse angle greater than a right angle with the normal face adjacent to each groove.

2. A high speed circular pulley provided with transverse grooves,—both of the opposing faces of each groove making an obtuse angle greater than a right angle with the normal face adjacent to each groove.

3. A high speed circular pulley provided with transverse grooves,—the opposing faces of each groove forming an obtuse angle greater than a right angle with the normal face adjacent, and the width of each face diminishing from the center toward each end of the pulley.

4. A high speed crown face circular pulley provided with transverse grooves,—the opposing faces of each groove forming an obtuse angle with the adjacent normal face of the pulley, and the circumferential width of each groove at the normal face being greatest at the center of the face and diminishing toward the ends of the pulley.

5. A high speed circular pulley provided in its normal face with transverse grooves having opposing faces making an obtuse angle with each other and also with the portions of the normal face adjacent to each groove.

In testimony whereof I have affixed my signature.

MILTON F. WILLIAMS.